United States Patent
Zhao et al.

(10) Patent No.: US 12,019,435 B2
(45) Date of Patent: Jun. 25, 2024

(54) MONITORING METHOD AND SYSTEM FOR DATA TRANSMISSION

(71) Applicant: Wistron Corp., New Taipei (TW)

(72) Inventors: Zong-Shui Zhao, New Taipei (TW); Wenyu Bao, New Taipei (TW)

(73) Assignee: WISTRON CORP., New Taipei (TW)

( * ) Notice: Subject to any disclaimer, the term of this patent is extended or adjusted under 35 U.S.C. 154(b) by 497 days.

(21) Appl. No.: 16/432,581

(22) Filed: Jun. 5, 2019

(65) Prior Publication Data

US 2020/0257278 A1  Aug. 13, 2020

(30) Foreign Application Priority Data

Feb. 12, 2019 (CN) .......................... 201910111044.4

(51) Int. Cl.
*G05B 23/02* (2006.01)
*G06F 3/04817* (2022.01)
*H04L 41/0631* (2022.01)
*H04L 41/0677* (2022.01)

(52) U.S. Cl.
CPC ....... *G05B 23/027* (2013.01); *G06F 3/04817* (2013.01); *H04L 41/0631* (2013.01); *H04L 41/0677* (2013.01)

(58) Field of Classification Search
CPC .............. G05B 23/027; G06F 3/04817; H04L 41/0631; H04L 41/0677
See application file for complete search history.

(56) References Cited

U.S. PATENT DOCUMENTS

| | | | |
|---|---|---|---|
| 2010/0106809 A1* | 4/2010 | Grohman | G05B 19/0428 709/220 |
| 2015/0304457 A1* | 10/2015 | Yu | H04L 43/10 709/203 |
| 2017/0118374 A1* | 4/2017 | Tsujiguchi | G06F 21/84 |
| 2018/0181750 A1* | 6/2018 | Lamothe-Brassard | G06F 21/554 |
| 2019/0294141 A1* | 9/2019 | Krauz | H04L 9/3234 |

(Continued)

FOREIGN PATENT DOCUMENTS

| | | | | |
|---|---|---|---|---|
| CN | 103795580 A | | 5/2014 | |
| CN | 106027351 A | * | 10/2016 | ....... H04L 12/40169 |
| CN | 106027351 A | | 10/2016 | |

(Continued)

*Primary Examiner* — William G Trost, IV
*Assistant Examiner* — Monishwar Mohan (57) ABSTRACT

A monitoring method for data transmission includes the following steps. Collection data is provided by data collection equipment when determining that equipment data has been received from an equipment terminal. Analysis data is provided by analysis equipment when determining that the collection data has been received from the data collection equipment. A data transmission state is displayed on a monitoring terminal when determining that the analysis data has been received from the analysis equipment. A first abnormal message is provided in response to the analysis data not having been received, and the data transmission state includes the first abnormal message indicating that the analysis equipment is abnormal. A second abnormal message is provided in response to the collection data not having been received, and the data transmission state includes the second abnormal message indicating that the collection equipment is abnormal.

20 Claims, 8 Drawing Sheets

(56) References Cited

U.S. PATENT DOCUMENTS

2020/0348662 A1 * 11/2020 Cella ................ G05B 19/41865

FOREIGN PATENT DOCUMENTS

| | | | |
|---|---|---|---|
| CN | 1590180 B | * | 7/2017 |
| CN | 107390650 A | * | 11/2017 |
| CN | 107390650 A | | 11/2017 |
| JP | 2001211106 A | * | 8/2001 |

* cited by examiner

MONITORING METHOD AND SYSTEM FOR DATA TRANSMISSION

CROSS REFERENCE TO RELATED APPLICATIONS

This application claims priority of China Patent Application No. 201910111044.4, filed on Feb. 12, 2019, the entirety of which is incorporated by reference herein.

BACKGROUND OF THE INVENTION

Field of the Invention

The present invention relates to a monitoring method and system, and in particular to an monitoring method and system for data transmission that is suitable for monitoring the production data of production equipment.

Description of the Related Art

With the widespread application of Internet of Things (IoT) technology, many manufacturing companies are able to collect large amounts of production data as well as other non-production data for production equipment according to requirements thereof. The above collection data is displayed on a monitoring system to monitor the production and operating state of each piece of equipment in the factory. The process of data collection and transmission is often complicated, and the data stream is collected and transmitted through a plurality of data nodes.

When a certain data node is abnormal, the data stream may become broken. Then, the user interface of the monitoring system may display no data, or it may display an abnormality. Since the user interface of the monitoring system only displays no data or abnormality, the user may not know quickly enough which data node has a problem, and the expenditure of manpower and time are needed so as to perform an investigation and troubleshooting. Therefore, data loss may be incurred, and troubleshooting the data stream takes longer, thereby decreasing the stability of the system. Therefore, how to quickly ascertain which data node corresponds to an abnormality has become the focus of efforts aimed at technical improvements by various manufacturers.

BRIEF SUMMARY OF THE INVENTION

An embodiment of the present invention provides a monitoring method and system for data transmission, thereby allowing operators to quickly know what equipment is experiencing the abnormality, and increasing the timeliness of data transmission monitoring and convenience of use.

An embodiment of the present invention provides a monitoring method for data transmission, which includes the following steps. Collection data is correspondingly provided by a data collection equipment when determining that equipment data has been received from an equipment terminal. Analysis data is correspondingly provided by an analysis equipment when determining that the collection data has been received from the data collection equipment. A data transmission state is correspondingly displayed on the monitoring terminal when determining that the analysis data has been received from the analysis equipment. A first abnormal message is provided by the monitoring terminal in response to the determination that the analysis data has not been received, wherein the data transmission state displayed on the monitoring terminal includes the first abnormal message indicating that the analysis equipment is abnormal. A second abnormal message is provided by the analysis equipment in response to the determination that the collection data has not been received, wherein the data transmission state displayed on the monitoring terminal includes the second abnormal message indicating that the collection equipment is abnormal.

In addition, an embodiment of the present invention provides a monitoring system for data transmission, which includes a data collection equipment, an analysis equipment and a monitoring terminal. The data collection equipment receives equipment data provided by an equipment terminal to provide collection data. The analysis equipment receives the collection data to provide analysis data. The monitoring terminal receives the analysis data to display the data transmission state. The monitoring terminal provides a first abnormal message in response to a determination that the analysis data has not been received, wherein the data transmission state displayed on the monitoring terminal includes the first abnormal message indicating that the analysis equipment is abnormal. The analysis equipment provides a second abnormal message in response to a determination that the collection data has not been received, wherein the data transmission state displayed on the monitoring terminal includes the second abnormal message indicating that the collection equipment is abnormal.

According to the equipment monitoring management method and system disclosed by the embodiment of the present invention, the abnormal message is provided correspondingly in response to the data from the previous-end equipment not having been received. Accordingly, the data transmission state displayed on the monitoring terminal correspondingly includes the abnormal message indicating that the equipment corresponding to the abnormal message is abnormal. Therefore, the equipment corresponding to the abnormality may be found quickly, so that the maintenance staff may quickly maintain and repair the abnormal equipment, thereby increasing the timeliness of the data transmission monitoring and the convenience of use.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In each of the following embodiments, the same reference number represents an element or component that is the same or similar.

Figure 1:
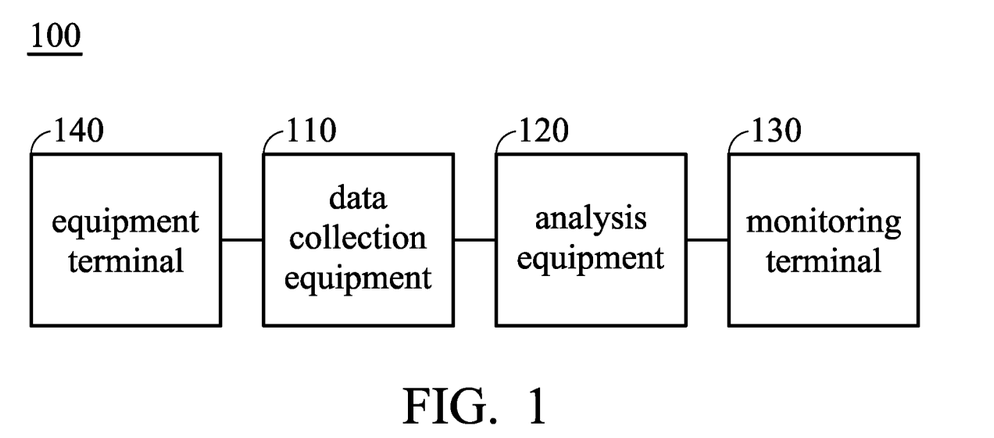
FIG. 1 shows a schematic view of a monitoring system for data transmission according to an embodiment of the present invention.

FIG. 1 shows a schematic view of a monitoring system for data transmission according to an embodiment of the present invention. Please refer to FIG. 1. The monitoring system for data transmission 100 includes a data collection equipment 110, an analysis equipment and a monitoring terminal 130. In the embodiment, the monitoring system for data transmission 100 is configured to monitor the data transmission between the monitoring terminal 130 and an equipment terminal 140 to determine whether the transmitted data is abnormal, and determine the equipment corresponding to the abnormality when an abnormality occurs. In some embodiments, the equipment terminal 140 may include a screw machine, an inspection machine, a labeling machine, a sealing machine, an assembly machine, etc., which are configured in the production line of a factory.

The data collection equipment 110 is connected to the equipment terminal 140. The data collection equipment 110 receives equipment data provided by the equipment terminal 140 to provide collection data. In the embodiment, the data collection equipment 110 may be a wired network equipment or a wireless network equipment. For example, the wired network equipment may include a wired network switch and network cable, etc. The wired network equipment may receive and transmit data through an Ethernet, an optical fiber network, or an asymmetric digital subscriber line (ADSL), etc. In addition, wireless network equipment may include a wireless network switch and a wireless access point (AP). The wireless network equipment receives and transmits data, for example, through wireless fidelity (WiFi) or another telecommunication network.

The analysis equipment 120 is connected to the data collection equipment 110. The analysis equipment 120 receives the collection data to provide analysis data. In the embodiment, the analysis equipment 120 may be equipped with a program and the program includes, for example, structured query language (SQL). For example, after the analysis equipment 120 receives the collection data provided by the data collection equipment 110, the analysis equipment 120 may analyze the collection data and transform the data format of the collection data to generate the analysis data. In some embodiments for example, the format of the analysis data is made to conform to the format required by the back-end equipment, so that the back-end equipment may perform the corresponding operation after receiving the analysis.

The monitoring terminal 130 is connected to the analysis equipment 120. The monitoring terminal 130 receives the analysis data to display the data transmission state. That is, when the monitoring terminal 130 receives the analysis data, this indicates that the data transmission between the monitoring terminal 130 and the equipment terminal 140 is normal. Then, the monitoring terminal 130 may display a monitoring frame through a display, and the data transmission state is correspondingly displayed on the monitoring frame to indicate that the data transmission is normal. Therefore, the user or maintenance staff may know that the data transmission between the monitoring terminal 130 and the equipment terminal 140 is normal by reading the data transmission state displayed on the monitoring terminal 130.

In the embodiment, the data collection equipment 110, the analysis equipment 120 and the monitoring terminal 130 may determine whether the corresponding data is received at each predetermined time interval to determine whether the transmitted data is abnormal, and determine the equipment corresponding to the abnormality when an abnormality occurs. For example, the predetermined time interval is five minutes, but not intended to limit the embodiment of the present invention. To suit operational requirements, the user may adjust the predetermined time interval to three minutes, ten minutes, twenty minutes, or another interval, and the adjustment thereof belongs to the protection scope of the embodiment of the present invention.

That is, the monitoring terminal 130 may determine whether the analysis data was received within the predetermined time interval. When the monitoring terminal 130 receives the analysis data, this indicates that the analysis equipment 120 is not abnormal. The monitoring terminal 130 correspondingly displays the data transmission state in response to receiving the analysis data to indicate that the operation of the analysis equipment is normal. When the monitoring terminal 130 does not receive the analysis data, this indicates that the analysis equipment 120 is abnormal. The monitoring terminal 130 may provide a first abnormal message in response to receiving the analysis data, so that the data transmission state displayed on the monitoring terminal 130 includes the first abnormal message indicating that the analysis equipment 120 is abnormal. Therefore, the user or the maintenance staff may know that the analysis equipment 120 is abnormal by reading the data transmission state displayed on the monitoring terminal 130.

The analysis equipment 130 may determine whether the collection data was received within the predetermined time interval. When the analysis equipment 120 receives the analysis data, this indicates that the data collection equipment 110 is not abnormal. The analysis equipment 120 generates the analysis data in response to receiving the collection data. Then, the monitoring terminal 130 correspondingly displays the data transmission state in response to receiving the analysis data to indicate that the operations of the data collection equipment 110 and the analysis equipment 120 are normal.

When the analysis equipment 120 does not receive the collection data, this indicates that the data collection equipment 110 is abnormal. The analysis equipment 120 may generate a second abnormal message in response to the collection data not having been received and the second abnormal message may be included in the analysis data. Then, the monitoring terminal 130 correspondingly displays the data transmission state in response to receiving the analysis data. That is, the transmission state displayed on the monitoring terminal 130 may include the second abnormal message indicating that the data collection equipment 110 is abnormal. Therefore, the user or the maintenance staff may know that the data collection equipment 110 is abnormal by reading the data transmission state displayed on the monitoring terminal 130.

The data collection equipment 110 may determine whether the equipment data was received within the predetermined time interval. When the data collection equipment 110 receives the equipment data, this indicates that the equipment terminal 140 is not abnormal. The data collection equipment 110 generates the collection data in response to receiving the equipment data. Then, the analysis equipment 120 generates the analysis data in response to receiving the collection data. Afterward, the monitoring terminal 130 correspondingly displays the data transmission state in response to receiving the analysis data to indicate that the operations of the equipment terminal 140, the data collection equipment 110 and the analysis equipment 120 are normal.

When the data collection equipment 110 does not receive the equipment data, this indicates that the equipment terminal 140 is abnormal. The data collection equipment 120 may generate a third abnormal message in response to the equipment data not having been received and the third abnormal message may be included in the collection data. Then, the analysis equipment 120 generates the analysis data in response to receiving the collection data. In some embodiments, the analysis data may also include the third abnormal message. Afterward, the monitoring terminal 130 correspondingly displays the data transmission state in response to receiving the analysis data. That is, the transmission state displayed on the monitoring terminal 130 may include the second abnormal message indicating that the equipment terminal 140 is abnormal. Therefore, the user or the maintenance staff may know that the equipment terminal 140 is abnormal by reading the data transmission state displayed on the monitoring terminal 130.

Furthermore, the monitoring terminal 130 may also generate an alarm message according to the first abnormal message, the second abnormal message, or the third abnormal message. In some embodiments, the alarm message may include information corresponding to the abnormal message, such as factory area, production line number, equipment name, equipment number, abnormal description, abnormal time, abnormal duration, etc. For example, when the monitoring terminal 130 generates the above alarm message, the monitoring terminal 130 may transmit the above alarm message to handheld equipment (such as mobile phone or tablet computer) of the relevant staff through a wireless network transmission. Therefore, the relevant staff may know which equipment or device is abnormal through the alarm message, thereby quickly performing the process of maintenance and repair.

In addition, the monitoring terminal 130 may display the data transmission state corresponding to the first abnormal message, the second abnormal message, or the third abnormal message in the form of at least one of an icon, a number, a shape, or a symbol. Alternatively, the monitoring terminal 130 may also display the data transmission state corresponding to the first abnormal message, the second abnormal message, or the third abnormal message by means of a color or dynamic change to at least one of the icon, the number, the shape, or the symbol.

Figure 2A:
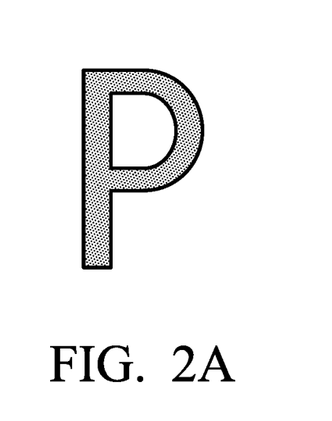
FIGS. 2A, 2B and 2C show schematic views of displaying data transmission states according to an embodiment of the present invention.
Figure 2B:
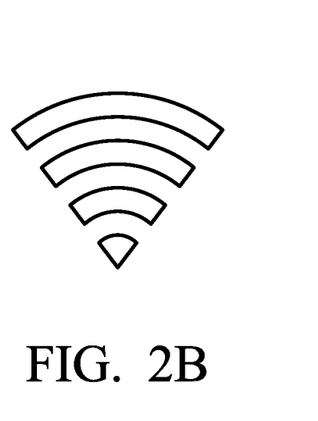
Figure 2C:
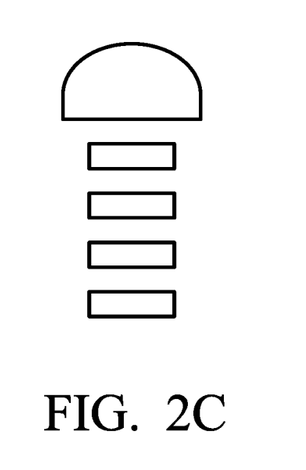

For example, in one embodiment, when the analysis equipment 120 is abnormal, the monitoring terminal 130 may display the data transmission state according to the first abnormal message, as shown in FIG. 2A. That is, the data transmission state is displayed as a red letter P. Alternatively, the data transmission state is displayed by means of a dynamic change in the flickering of the red letter P. This indicates that the analysis equipment 120 is abnormal. When the data collection equipment 110 is abnormal, the monitoring terminal 130 may display the data transmission state according to the second abnormal message, as shown in FIG. 2B. That is, the data transmission state is displayed as a red signal icon. Alternatively, the data transmission state is displayed by means of a change in the flickering of the red signal icon. This indicates that the data collection equipment 120 is abnormal. When the equipment terminal (such as the screw machine) 140 is abnormal, the monitoring terminal 130 may display the data transmission state according to the third abnormal message, as shown in FIG. 2C. That is, the data transmission state is displayed as a red screw icon. Alternatively, the data transmission state is displayed by means of a change in the flickering of the red screw icon. This indicates that the equipment terminal (such as the screw machine) 140 is abnormal.

In another embodiment, when the analysis equipment 120 is abnormal, the monitoring terminal 130 may display the data transmission state as, for example, a number "1" according to the first abnormal message. When the data collection equipment 110 is abnormal, the monitoring terminal 130 may display the data transmission state as, for example, a number "2" according to the second abnormal message. When the equipment terminal (such as the screw machine) 140 is abnormal, the monitoring terminal 130 may display the data transmission state as, for example, a number "3" according to the third abnormal message.

In another embodiment, when the analysis equipment 120 is abnormal, the monitoring terminal 130 may display the data transmission state as, for example, a "rectangle" according to the first abnormal message. When the data collection equipment 110 is abnormal, the monitoring terminal 130 may display the data transmission state as, for example, a "circle" according to the second abnormal message. When the equipment terminal (such as the screw machine) 140 is abnormal, the monitoring terminal 130 may display the data transmission state as, for example, a "square" according to the third abnormal message.

In another embodiment, when the analysis equipment 120 is abnormal, the monitoring terminal 130 may display the data transmission state as, for example, a symbol "P" according to the first abnormal message. When the data collection equipment 110 is abnormal, the monitoring terminal 130 may display the data transmission state as, for example, a symbol "N" according to the second abnormal message. When the equipment terminal (such as the screw machine) 140 is abnormal, the monitoring terminal 130 may display the data transmission state as, for example, a symbol "D" according to the third abnormal message.

Furthermore, the icon, the number, the shape, the symbol, or the manner in which the icon, the number, the shape, or the symbol change color or motion as described above is only one exemplary embodiment of the embodiments of the present invention, but not intended to limit the embodiment of the present invention. The user may make adjustments and use other icons, numbers, shapes, symbols or other ways of changing the color or motion of the icons, the numbers, the shapes, or the symbols, depending upon requirements, and the adjustments belong to the protection scope of the embodiment of the present invention.

In addition, in one embodiment, when the data collection equipment 110 includes the wired network equipment, the analysis equipment may be further configured in the equipment terminal 140. Furthermore, the data transmission among the equipment terminal 140, the data collection equipment 110, the analysis equipment 120 and the monitoring terminal 130 is still identical to the above embodiment and the description thereof is not repeated herein.

In the embodiment of the present invention, the data collection equipment 110, the analysis equipment 120 and the monitoring terminal 130 may be regarded as independent data nodes. For example, the data collection equipment 110 is a first data node, the analysis equipment 120 is a second data node and the monitoring terminal 130 is a third data node. The abnormal message is correspondingly provided in response to the previous data node (i.e., the front-end equipment) not having been received, so that the transmission state displayed on the monitoring terminal correspondingly includes the abnormal message indicating that the data node corresponding to the abnormal message is abnormal.

In addition, the abnormal message may also include a coordinate position and an identifier of the data node corresponding to the abnormal message, so that the monitoring terminal displays the data transmission state including the abnormal message and also displays the data transmission state on the corresponding position of a monitoring frame. Therefore, the equipment corresponding to the abnormality and the position corresponding to the equipment may be quickly known, so that the maintenance staff may quickly maintain and repair the abnormal equipment.

Figure 3:
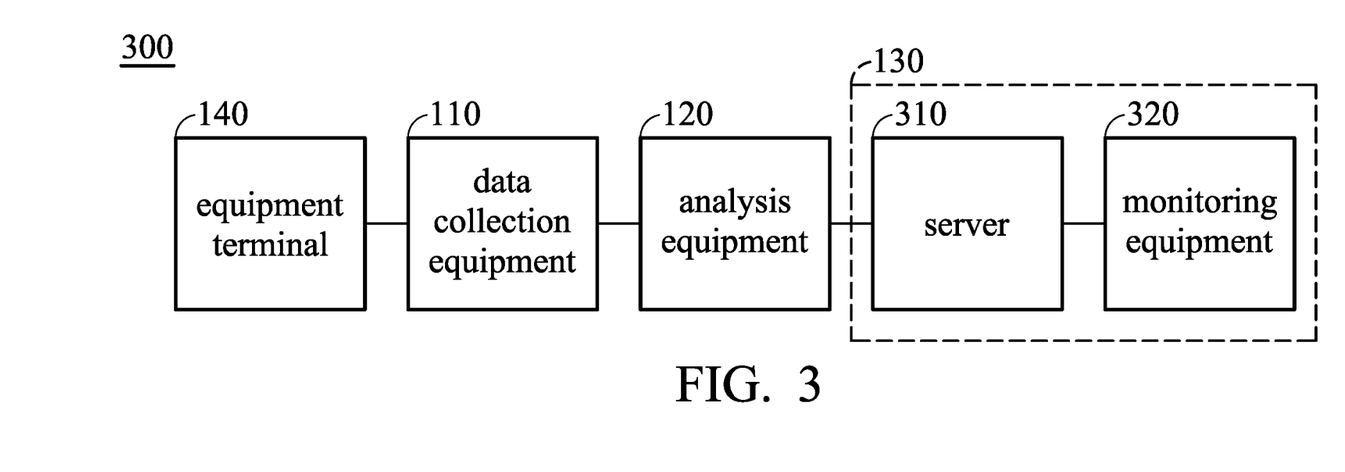
FIG. 3 shows a schematic view of a monitoring system for data transmission according to another embodiment of the present invention.

FIG. 3 shows a schematic view of a monitoring system for data transmission according to another embodiment of the present invention. Please refer to FIG. 3. The monitoring system for data transmission 300 includes data collection equipment 110, analysis equipment, a monitoring terminal 130 and an equipment terminal 140. In the embodiment, the monitoring system for data transmission 300 is configured to monitor the data transmission between the monitoring terminal 130 and an equipment terminal 140 to determine whether the transmitted data is abnormal, and determine the equipment corresponding to the abnormality when an abnormality occurs. Furthermore, the connection relationship and relevant operation of the data collection equipment 110, the analysis equipment 120, the monitoring terminal 130 and the equipment terminal 140 are described by the embodiment illustrated in FIG. 1 and the description thereof is not repeated herein.

The monitoring terminal 130 includes a server 310 and monitoring equipment 320. The server 310 is connected to the analysis equipment 120. The server 310 receives the analysis data provided by the analysis equipment 120 to generate server data. The monitoring equipment 320 is connected to the server 310. The monitoring equipment 320 receives the server data to display the data transmission state. Then, the monitoring equipment 320 may display a monitoring frame through a display, and the data transmission state is correspondingly displayed on the monitoring frame to indicate that the data transmission is normal. Therefore, the user or the maintenance staff may know that the data transmission between the monitoring terminal 130 and the equipment terminal 140 is normal by reading the data transmission state displayed on the monitoring equipment 320.

In the embodiment, the server 310 and the monitoring equipment 320 may also determine whether the corresponding data is received at each predetermined time interval to determine whether the transmitted data is abnormal, and determine the equipment corresponding to the abnormality when an abnormality occurs. For example, the predetermined time interval may be five minutes, but this is not intended to limit the embodiment of the present invention. To suit operational requirements, the user may adjust the predetermined time interval to three minutes, ten minutes, twenty minutes, or another interval, and the adjustment thereof belongs to the protection scope of the embodiment of the present invention.

That is, the monitoring equipment 320 may determine whether the server data was received within the predetermined time interval. When the monitoring equipment 320 determines that the server data is received, this indicates that the server 310 is not abnormal. The monitoring equipment 320 correspondingly displays the data transmission state in response to receiving the server data to indicate that the operation of the server 310 is normal.

When the monitoring equipment 320 determines that the server data has not been received, this indicates that the server 310 is abnormal. The monitoring equipment 320 provides a fourth abnormal message in response to the server data not having been received, so that the data transmission state displayed on the monitoring equipment 320 includes the fourth abnormal message indicating that the server 310 is abnormal. Therefore, the user or the maintenance staff may know that the server 310 is abnormal by reading the data transmission state displayed on the monitoring equipment 320.

That is, the server 310 may determine whether the analysis data was received within the predetermined time interval. When the server 310 determines that the analysis data is received, this indicates that the analysis equipment 120 is not abnormal. The server 310 generates the server data in response to receiving the analysis data. Then, the monitoring equipment 320 correspondingly displays the data transmission state in response to receiving the server data to indicate that the operations of the analysis equipment 120 and the server 310 are normal.

When the server 310 determines that the server data has not been received, this indicates that the analysis equipment 120 is abnormal. The server 310 may provide the first abnormal message in response to the analysis data not having been received, and the first abnormal message may be included in the server data. Then, the monitoring equipment 320 correspondingly displays the data transmission state in response receiving the server data. That is, the data transmission state displayed on the monitoring equipment 320 may include the first abnormal message indicating that the analysis equipment 120 is abnormal. Therefore, the user or the maintenance staff may know that the analysis equipment 120 is abnormal by reading the data transmission state displayed on the monitoring terminal 130.

Furthermore, the monitoring equipment 320 may also generate an alarm message according to the fourth abnormal message. In some embodiments, the alarm message may include information corresponding to the abnormal message, such as factory area, production line number, equipment name, equipment number, abnormal description, abnormal time, abnormal duration, etc. In addition, when the monitoring equipment 320 generates the above alarm message, the monitoring equipment 320 may transmit the above alarm message to handheld equipment (such as mobile phone or tablet computer) of the relevant staff through the wireless network transmission. Therefore, the relevant staff may know which equipment or device is abnormal through the alarm message, thereby quickly performing the process of maintenance and repair.

Furthermore, the monitoring equipment 320 may display the data transmission state corresponding to the first abnormal message, the second abnormal message, or the third abnormal message in the form of at least one of an icon, a number, a shape, or a symbol. Alternatively, the monitoring equipment 320 may also display the data transmission state corresponding to the first abnormal message, the second abnormal message, or the third abnormal message by means of a color or dynamic change to at least one of the icon, the number, the shape, or the symbol.

Figure 4:
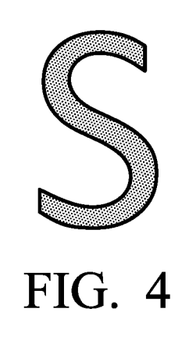
FIG. 4 shows a schematic view of the data transmission state being displayed according to an embodiment of the present invention.

For example, in one embodiment, when the server 310 is abnormal, the monitoring equipment 320 may display the data transmission state according to the fourth abnormal message, as shown in FIG. 4. That is, the data transmission state is displayed as a red letter S. Alternatively, the data transmission state is displayed by means of a change in the flickering of the red letter S. This indicates that the server 310 is abnormal. In another embodiment, when the server 310 is abnormal, the monitoring equipment 320 may display the data transmission state as, for example, a number "4" according to the fourth abnormal message. In another embodiment, when the server 310 is abnormal, the monitoring equipment 320 may display the data transmission state as, for example, a "triangle" according to the fourth abnormal message.

Furthermore, the icon, the number, the shape, or the symbol, or the manner in which the icon, the number, the shape, or the symbol change color or motion as described above is only one exemplary embodiment of the embodiments of the present invention, and is not intended to limit the embodiment of the present invention. The user may make adjustments and use other icons, numbers, shapes, symbol or other ways of changing the color or motion of the icons, the numbers, the shapes, or the symbols, depending upon requirements, and the adjustments belong to the protection scope of the embodiment of the present invention.

In the embodiment of the present invention, the data collection equipment 110, the analysis equipment 120, the server 310 and the monitoring equipment 320 may be regarded as independent data nodes. The abnormal message is correspondingly provided in response to the previous data node (i.e., the front-end equipment) not having been received, so that the transmission state displayed on the monitoring terminal correspondingly includes the abnormal message indicating that the data node corresponding to the abnormal message is abnormal.

In addition, the abnormal message may also include a coordinate position and an identifier of the data node corresponding to the abnormal message, so that the monitoring terminal displays the data transmission state including the abnormal message and also displays the data transmission state on the corresponding position of a monitoring frame. Therefore, the equipment corresponding to the abnormality and the position corresponding to the equipment may be quickly known, so that the maintenance staff may quickly maintain and repair the abnormal equipment.

Figure 5:
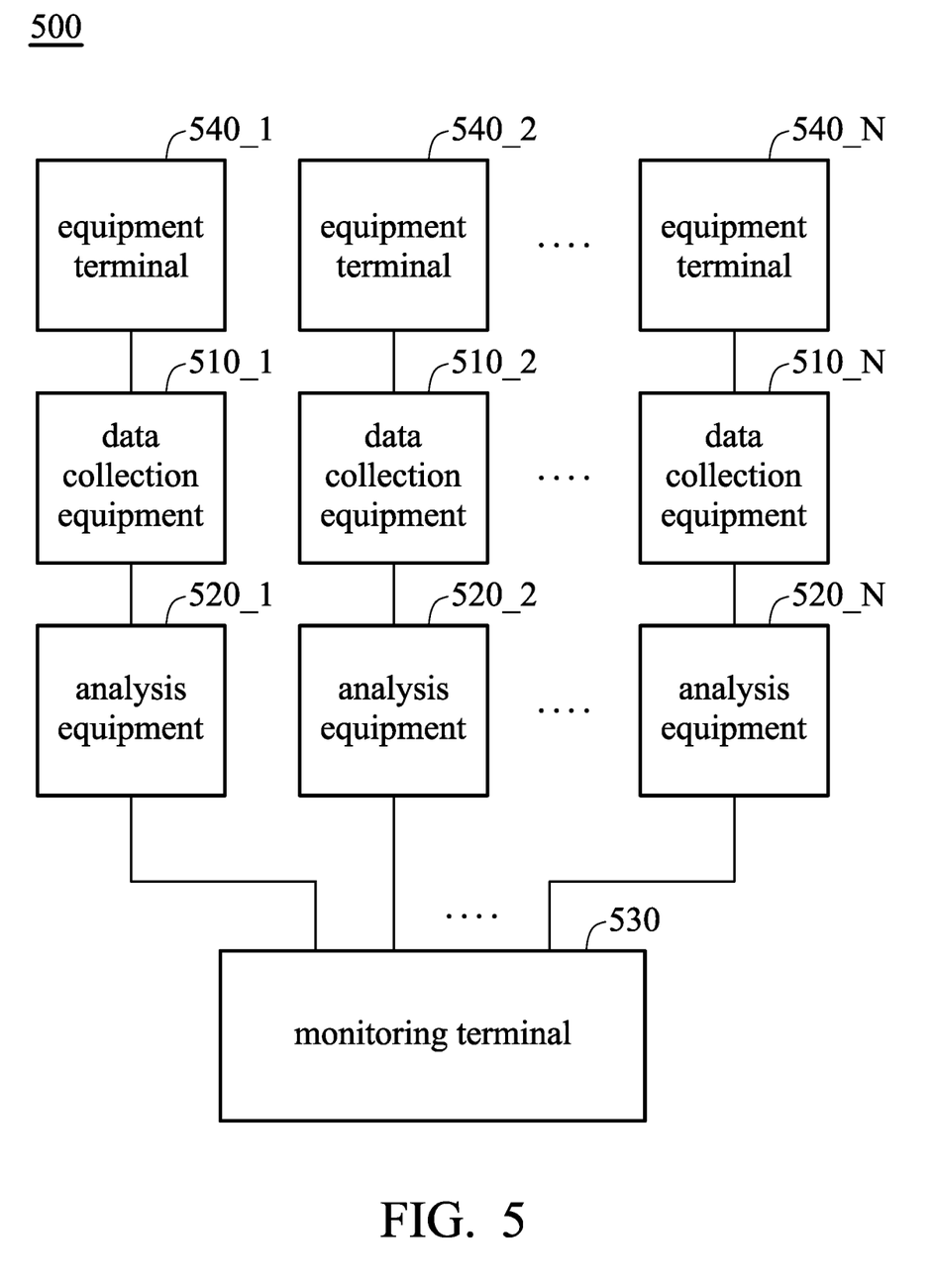
FIG. 5 shows a schematic view of a monitoring system for data transmission according to another embodiment of the present invention.

FIG. 5 shows a schematic view of a monitoring system for data transmission according to another embodiment of the present invention. Please refer to FIG. 5. The monitoring system for data transmission 500 includes data collection equipment 510_1 to 510_N, analysis equipment 520_1 to 520_N and a monitoring terminal 530, wherein N is a positive integer greater than 1. In the embodiment, the monitoring system for data transmission 500 is configured to monitor the data transmission between the monitoring terminal 130 and equipment terminals 540_1 to 540_N to determine whether the transmitted data is abnormal, and determine the equipment corresponding to the abnormality when an abnormality occurs.

Furthermore, the connection relationship and relevant operation of the data collection equipment 510_1 to 510_N, the analysis equipment 520_1 to 520_N, the monitoring terminal 530 and the equipment terminals 540_1 to 540_N are identical to or similar to that of the data collection equipment 110, the analysis equipment 120, the monitoring terminal 130 and the equipment terminals 140_1. The description above may be analogous to what has been described in the embodiment illustrated in FIG. 1 and the description thereof is not repeated herein.

In the embodiment of the present invention, the data collection equipment 510_1 to 510_N, the analysis equipment 520_1 to 520_N and the monitoring terminal 530 may be regarded as independent data nodes. The abnormal message is correspondingly provided in response to the previous data node (i.e., the front-end equipment) not having been received, so that the transmission state displayed on the monitoring terminal correspondingly includes the abnormal message indicating that the data node corresponding to the abnormal message is abnormal.

In addition, the abnormal message may also include a coordinate position and an identifier of the data node corresponding to the abnormal message, so that the monitoring terminal displays the data transmission state including the abnormal message and also displays the data transmission state on the corresponding position of a monitoring frame. Therefore, the equipment corresponding to the abnormality and the position corresponding to the equipment may be quickly known, so that the maintenance staff may quickly maintain and repair the abnormal equipment.

Figure 6:
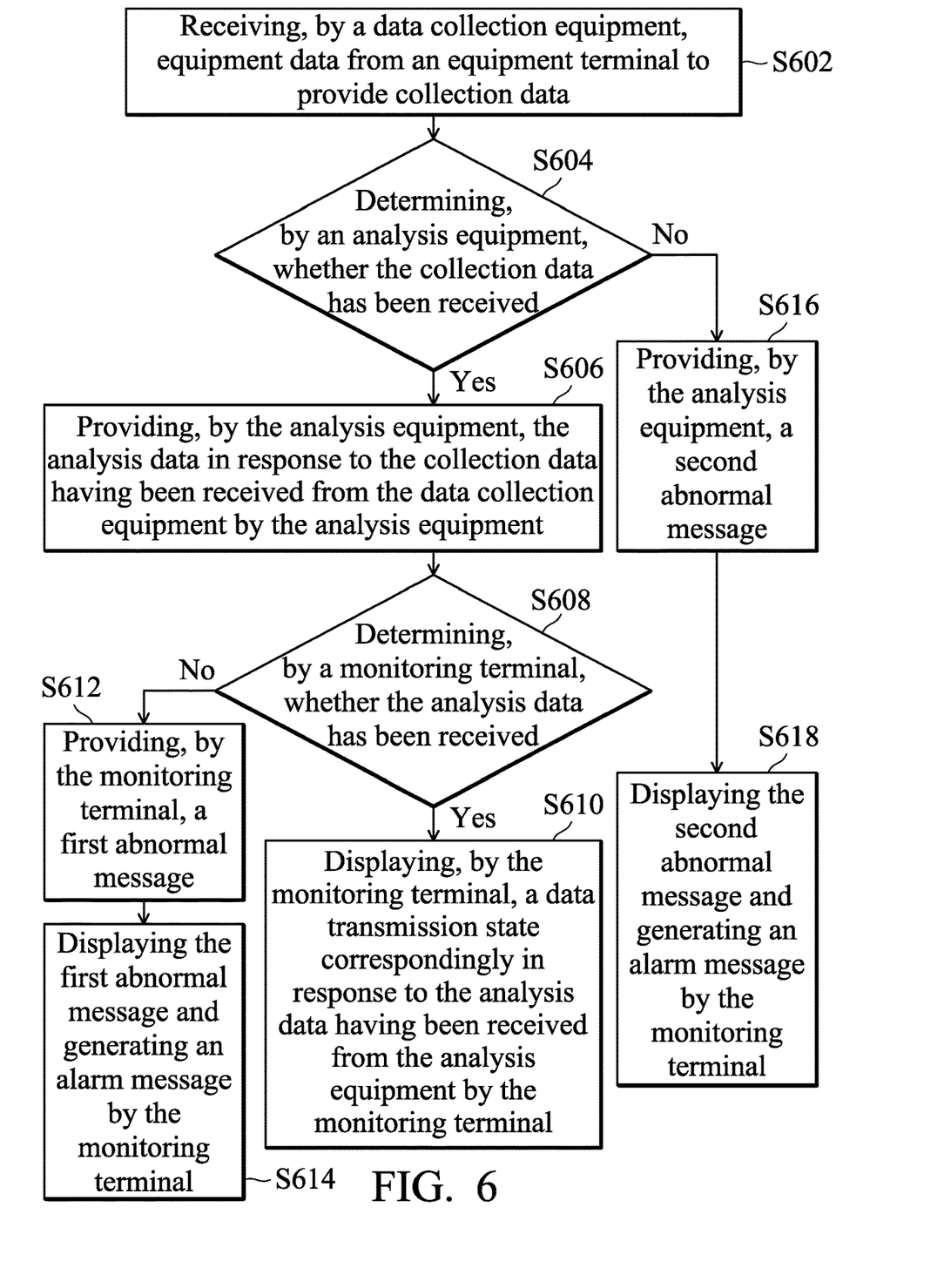
FIG. 6 is a flowchart of a monitoring method for data transmission according to an embodiment of the present invention.

FIG. 6 is a flowchart of a monitoring method for data transmission according to an embodiment of the present invention. In step S602, the method involves receiving, by a data collection equipment, equipment data from an equipment terminal to provide collection data. In step S604, the method involves determining, by an analysis equipment, whether the collection data has been received. When the analysis equipment determines that the collection data has been received, the method proceeds to step S606. In step S606, the method involves providing, by the analysis equipment, the analysis data in response to the collection data having been received from the data collection equipment by the analysis equipment.

In step S608, the method involves determining, by a monitoring terminal, whether the analysis data has been received. When the monitoring terminal determines that the analysis data has been received, the method proceeds to step S610. In step S610, the method involves displaying, by the monitoring terminal, a data transmission state correspondingly in response to the analysis data having been received from the analysis equipment by the monitoring terminal to indicate that the data collection equipment and the analysis equipment are not abnormal. Conversely, when the monitoring terminal determines that the analysis data has not been received, the method proceeds to step S612. In step S612, the method involves providing, by the monitoring terminal, a first abnormal message correspondingly in response to the analysis data not having been received from the analysis equipment by the monitoring terminal. In step S614, the method involves displaying the first abnormal message and generating an alarm message by the monitoring terminal. That is, the data transmission state displayed on the monitoring terminal includes the first abnormal message indicating that the data collection equipment is abnormal.

Continuing to step S604, when the analysis equipment determines that the collection data has not been received, the method proceeds to step S616. In step S616, the method involves providing, by the analysis equipment, a second abnormal message correspondingly in response to the collection data not having been received from the data collection equipment by the analysis equipment. In step 618, the method involves displaying the second abnormal message and generating an alarm message by the monitoring terminal. That is, the data transmission state displayed on the monitoring terminal includes the second abnormal message indicating that the data collection equipment is abnormal.

In the embodiment, the data transmission state corresponding to the first abnormal message or the second abnormal message may be displayed in the form of at least one of an icon, a number, a shape, or a symbol. Alternatively, the data transmission state corresponding to the first abnormal message or the second abnormal message may be displayed by means of a color or dynamic change to at least one of the icon, the number, the shape, or the symbol. In addition, the data collection equipment includes a wired network equipment or a wireless network equipment. When the data collection equipment includes the wired network equipment, the analysis equipment is disposed on the equipment terminal.

Figure 7A:
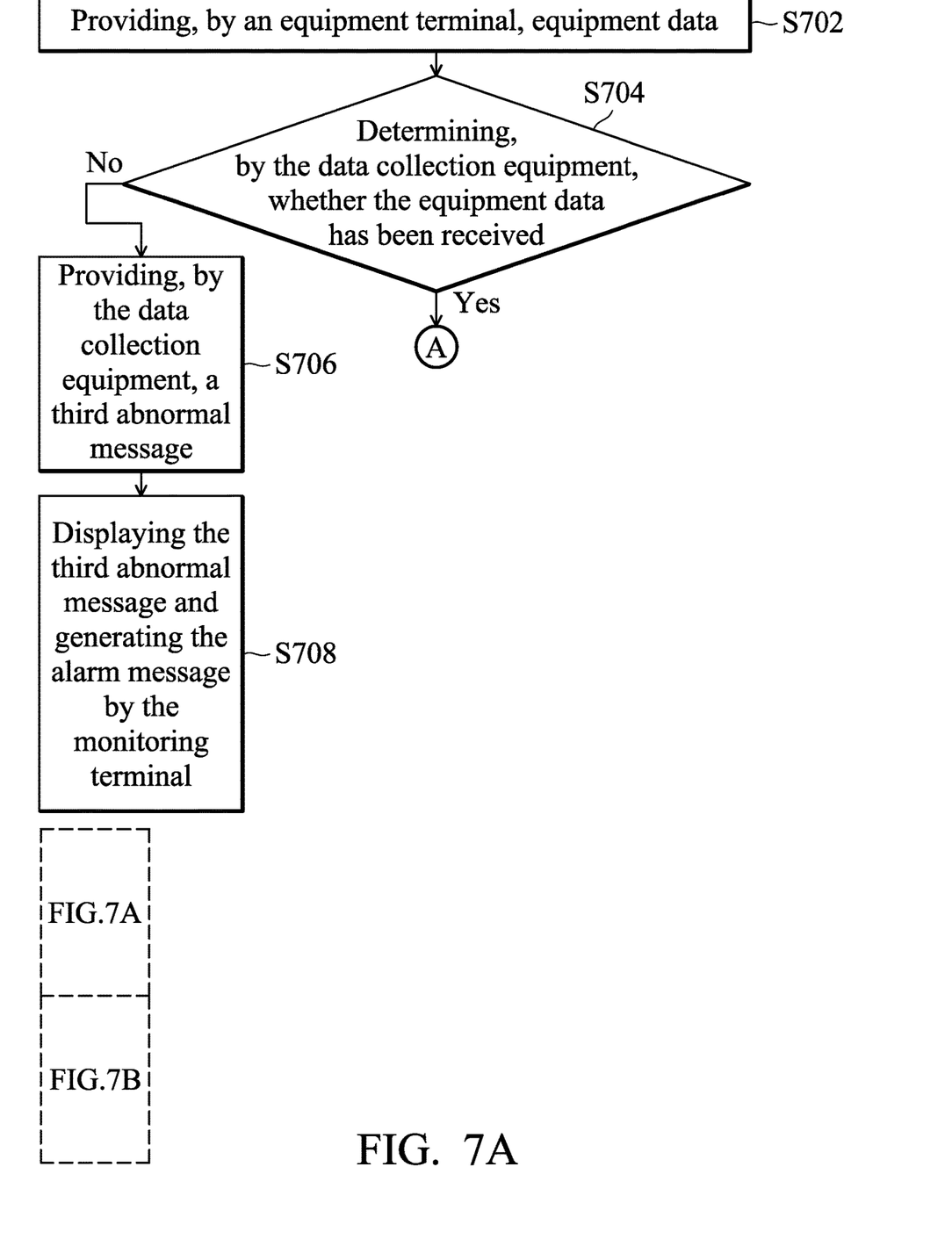
FIGS. 7A and 7B are a flowchart of a monitoring method for data transmission according to another embodiment of the present invention.
Figure 7B:
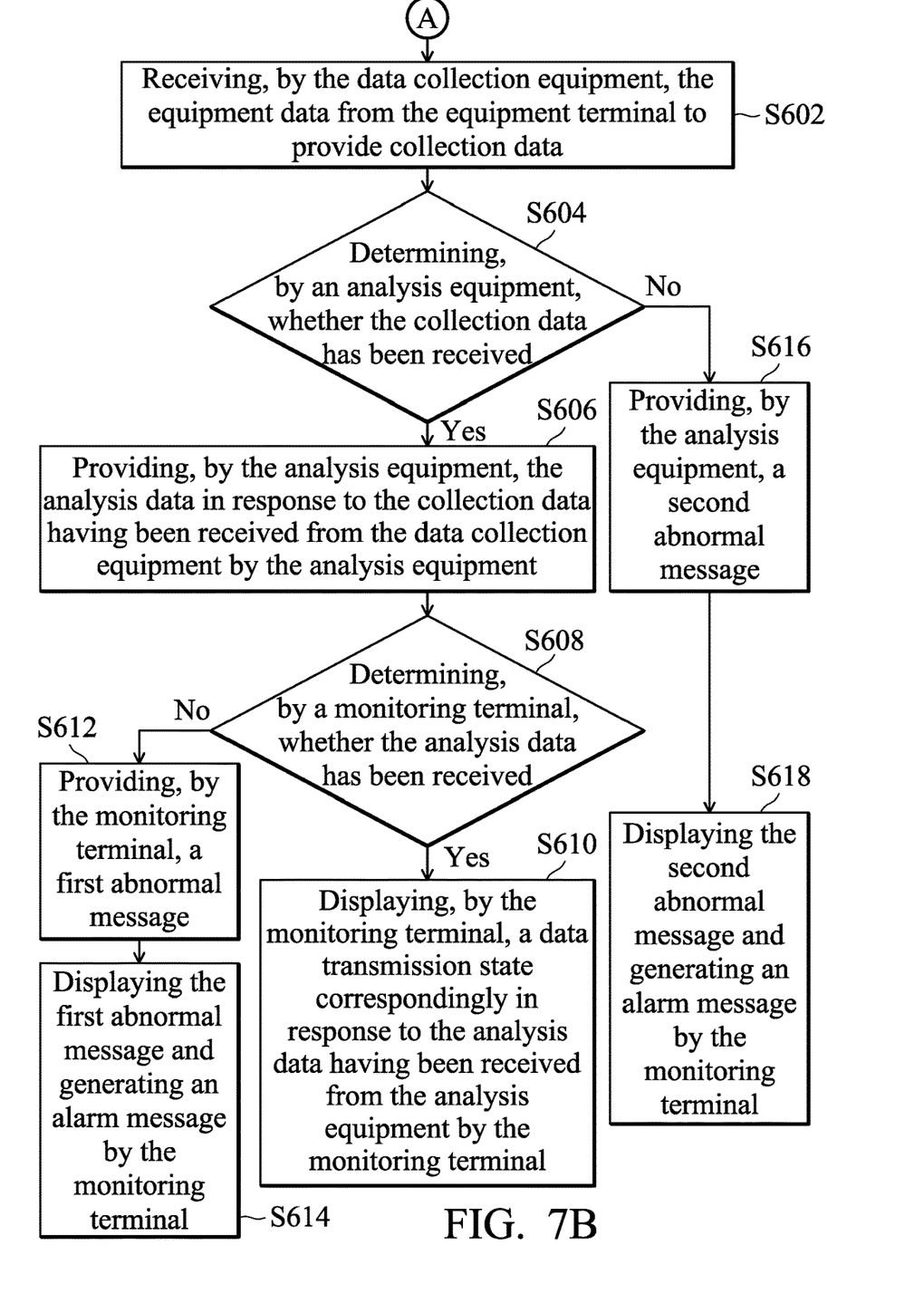

FIGS. 7A and 7B are a flowchart of a monitoring method for data transmission according to another embodiment of the present invention. In the embodiment, steps S602 to S618 are identical to or similar to steps S602 to 618 in FIG. 6, and their operation may be analogous to what has been described in the embodiment illustrated in FIG. 6 and the descriptions thereof are not repeated herein.

In step S702, the method involves providing, by an equipment terminal, equipment data. In step S704, the method involves determining, by the data collection equipment, whether the equipment data has been received. When the data collection equipment determines that the equipment data has been received, the method proceeds to step S602. In step S602, the method involves receiving, by the data collection equipment, the equipment data from the equipment terminal to provide collection data.

Conversely, when the data collection equipment determines that the equipment data has not been received, the method proceeds to step S706. In step S706, the method involves providing, by the data collection equipment, a third abnormal message correspondingly in response to the equipment data not having been received from the equipment terminal by the data collection equipment. In step S708, the method involves displaying the third abnormal message and generating the alarm message by the monitoring terminal. That is, the data transmission state displayed on the monitoring terminal includes the third abnormal message indicating that the equipment terminal is abnormal.

In the embodiment, the data transmission state corresponding to the first abnormal message, the second abnormal message, or the third abnormal message may be displayed in the form of at least one of an icon, a number, a shape, or a symbol. Alternatively, the data transmission state corresponding to the first abnormal message, the second abnormal message, or the third abnormal message may be displayed by means of a color or dynamic change to at least one of the icon, the number, the shape, or the symbol. In addition, the data collection equipment includes a wired network equipment or a wireless network equipment. When the data collection equipment includes the wired network equipment, the analysis equipment is disposed on the equipment terminal.

Figure 8A:
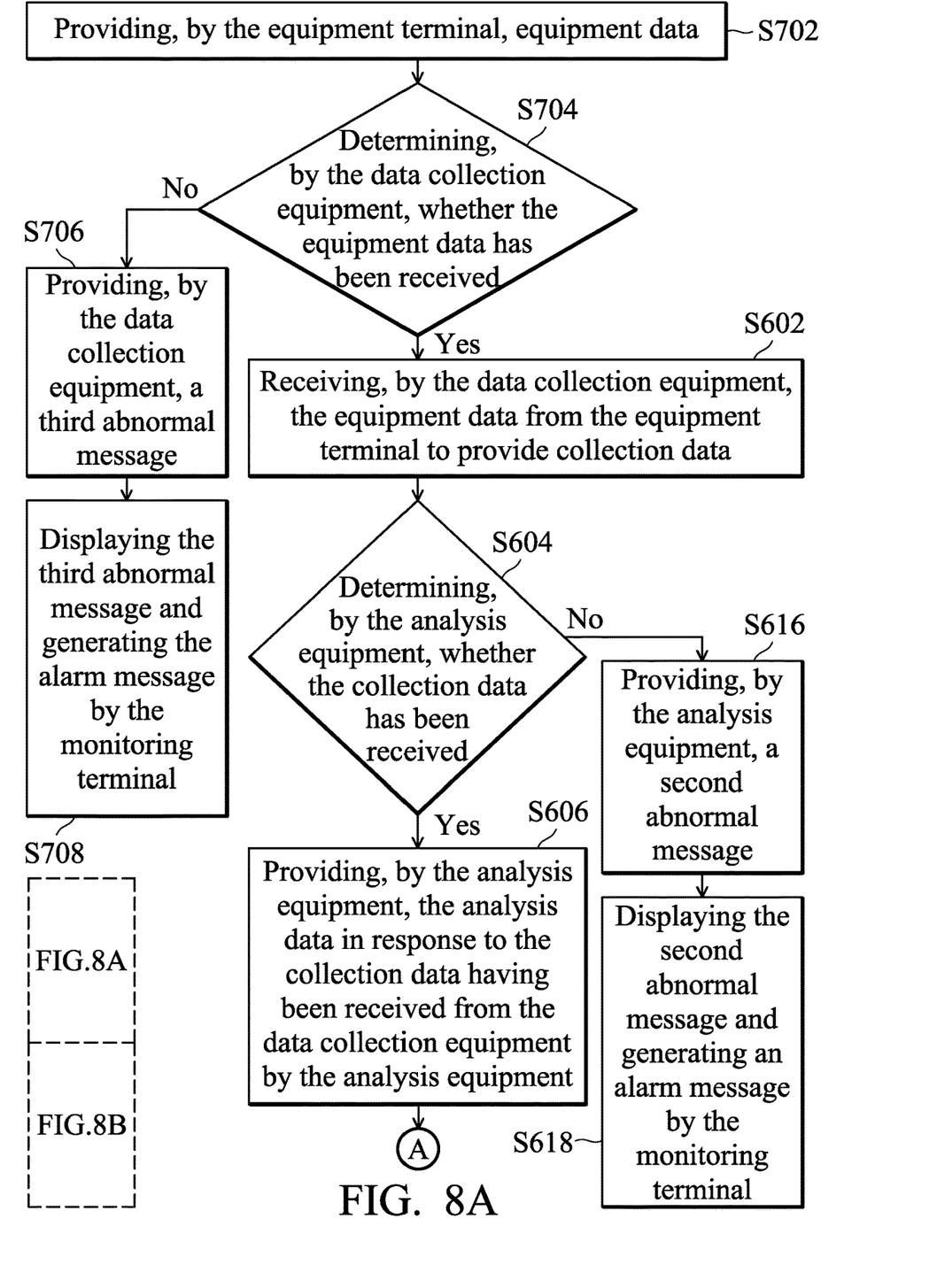
FIGS. 8A and 8B are a flowchart of a monitoring method for data transmission according to another embodiment of the present invention.
Figure 8B:
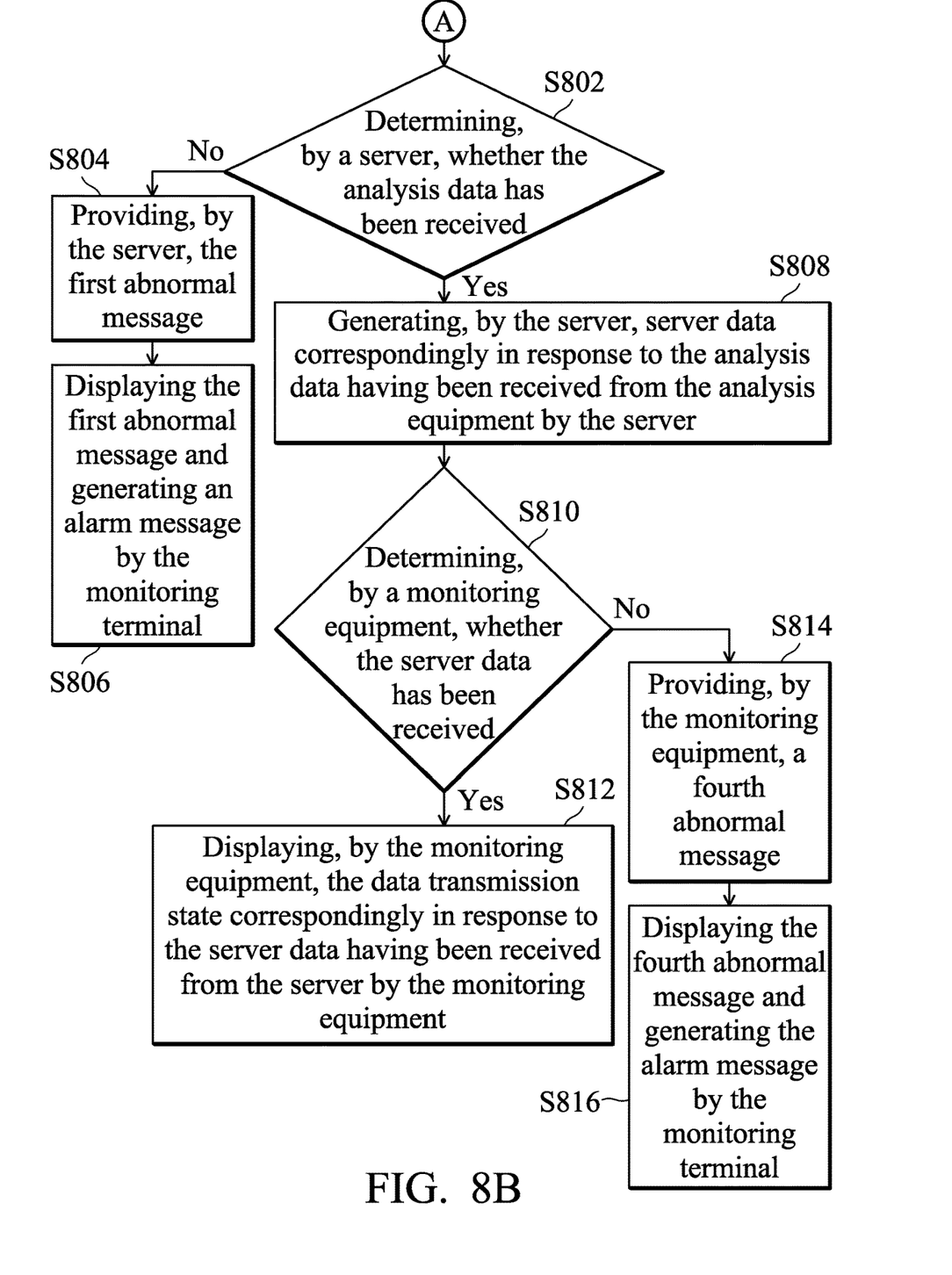

FIGS. 8A and 8B are a flowchart of a monitoring method for data transmission according to another embodiment of the present invention. In the embodiment, steps S602 to S606, S616 to S618 and S702 to 708 are identical to or similar to steps S602 to S606, S616 to S618 and S702 to 708 in FIG. 7, and their operation may be analogous to what has been described in the embodiment illustrated in FIG. 7 and the descriptions thereof are not repeated herein. In step S802, the method involves determining, by a server, whether the analysis data has been received. When the server determines that the analysis data has not been received, the method proceeds to step S804. In step S804, the method involves providing, by the server, the first abnormal message correspondingly in response to the analysis data not having been received from the analysis equipment by the server. In step S806, the method involves displaying the first abnormal message and generating an alarm message by the monitoring terminal. That is, the data transmission state displayed on the monitoring terminal includes the first abnormal message indicating that the analysis equipment is abnormal.

Continuing to step S802, when the server determines that the analysis data has been received, the method proceeds to step S808. In step S808, the method involves generating, by the server, server data correspondingly in response to the analysis data having been received from the analysis equipment by the server. In step S810, the method involves determining, by a monitoring equipment, whether the server data has been received. When the monitoring equipment determines that the server data has been received, the method proceeds to step S812. In step S812, the method involves displaying, by the monitoring equipment, the data transmission state correspondingly in response to the server data having been received from the server by the monitoring equipment to indicate that the equipment terminal, the data collection equipment, the analysis equipment, and the server are not abnormal. Conversely, when the monitoring equipment determines that the server data has not been received, the method proceeds to step S814. In step S814, the method involves providing, by the monitoring equipment, a fourth abnormal message correspondingly in response to the server data not having been received from the server by the monitoring equipment. In step S816, the method involves displaying the fourth abnormal message and generating the alarm message by the monitoring terminal. That is, the data transmission state displayed on the monitoring terminal includes the fourth abnormal message indicating that the server is abnormal.

In the embodiment, the data transmission state corresponding to the first abnormal message, the second abnormal message, the third abnormal message, or the fourth abnormal message may be displayed in the form of at least one of an icon, a number, a shape, or a symbol. Alternatively, the data transmission state corresponding to the first abnormal message, the second abnormal message, the third abnormal message, or the fourth abnormal message may be displayed by means of a color or dynamic change to at least one of the icon, the number, the shape, or the symbol. In addition, the data collection equipment includes a wired network equipment or a wireless network equipment. When the data collection equipment includes the wired network equipment, the analysis equipment is disposed on the equipment terminal.

Furthermore, it is worth mentioning that if the equipment (such as the screw machine) of the equipment terminal 140 is turned off, the equipment terminal 140 may generate a message of shutdown OFF, so that the data collection equipment 110 may still receive, for example, the equipment data with the message of shutdown OFF. Accordingly, the data collection equipment 110 may not determine the equipment data of the equipment terminal 140 not having been received. Therefore, the data collection equipment 110 may not provide the third abnormal message to the analysis equipment 120, so that the monitoring frame displayed on the display equipment of the monitoring terminal 130 may correctly display that the equipment is in the shutdown state, so as to avoid misjudging it as being in an abnormal state.

Moreover, in the foregoing embodiments illustrated in FIG. 1, FIG. 3 and FIG. 5, the data transmission process of the equipment terminal, the data collection equipment, the analysis equipment, and the monitoring terminal is schematically expressed, and is not configured to define a one-to-one relationship. For example, in a factory production line, a structure consisting of one unit of data collection equipment collocated with a plurality of equipment terminals may be established. Similarly, a structure consisting of one monitoring terminal collocated with a plurality of analysis equipment may also be established.

In summary, according to the equipment monitoring management method and system, an abnormal message is correspondingly provided in response to data not having been received from the front-end equipment. Accordingly, the data transmission state displayed on the monitoring terminal correspondingly includes the abnormal message indicating that the equipment corresponding to the abnormal message is abnormal. In addition, the embodiment of the present invention may correspondingly generate the an alarm message according to the abnormal message. The abnormal message may be transmitted to handheld equipment of the relevant staff. Therefore, the equipment corresponding to the abnormality may be quickly known, so that the maintenance staff may quickly maintain and repair the abnormal equipment, thereby increasing the timeliness of the data transmission monitoring and the convenience of use.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A monitoring method for data transmission, comprising:
    providing, by a data collection equipment, collection data correspondingly in response to a determination that equipment data has been received from an equipment terminal by the data collection equipment;
    determining, by an analysis equipment, that collection data is received by the analysis equipment;
    providing, by the analysis equipment, analysis data correspondingly in response to the determination that the collection data has been received from the data collection equipment by the analysis equipment;
    determining, by a monitoring terminal, that analysis data is received by the monitoring terminal;
    displaying, by the monitoring terminal, a data transmission state correspondingly in response to the determination that the analysis data has been received from the analysis equipment by the monitoring terminal;
    determining, by the monitoring terminal, that analysis data is not received by the monitoring terminal;
    generating, by the monitoring terminal, a first abnormal message in response to the determination that the analysis data is not received by the monitoring terminal, and displaying, by the monitoring terminal, the data transmission state corresponding to the first abnormal message accordingly; and
    determining, by the analysis equipment, that collection data is not received by the analysis equipment;
    providing, by the analysis equipment, a second abnormal message to the monitoring terminal over a network in response to the determination that the collection data is not received by the analysis equipment, and displaying, by the monitoring terminal, the data transmission state corresponding to the second abnormal message accordingly.

2. The monitoring method for data transmission as claimed in claim 1, further comprising:
    providing, by the data collection equipment, a third abnormal message to the monitoring terminal through the analysis equipment over the network in response to a determination that the equipment data is not received by the data collection equipment, and displaying, by the monitoring terminal, the data transmission state corresponding to the third abnormal message accordingly.

3. The monitoring method for data transmission as claimed in claim 2, further comprising:
    generating an alarm message according to the first abnormal message, the second abnormal message, or the third abnormal message.

4. The monitoring method for data transmission as claimed in claim 2, wherein the data transmission state corresponding to the first abnormal message, the second abnormal message, or the third abnormal message is displayed in the form of at least one of an icon, a number, a shape, or a symbol, or the data transmission state corresponding to the first abnormal message, the second abnormal message, or the third abnormal message is displayed by means of a color or dynamic change to at least one of the icon, the number, the shape, or the symbol.

5. The monitoring method for data transmission as claimed in claim 2, wherein the monitoring terminal comprises a server and a monitoring equipment, and the step of displaying, by the monitoring terminal, the data transmission state correspondingly in response to the determination that the analysis data has been received from the analysis equipment by the monitoring terminal comprises:
    providing, by the server, server data correspondingly in response to the determination that the analysis data has been received from the analysis equipment by the server; and
    displaying, by the monitoring equipment, the data transmission state correspondingly in response to the determination that the server data has been received from the server by the monitoring equipment.

6. The monitoring method for data transmission as claimed in claim 5, wherein the step of generating, by the monitoring terminal, the first abnormal message in response to the determination that the analysis data is not received by the monitoring terminal, and displaying, by the monitoring terminal, the data transmission state corresponding to the first abnormal message accordingly, comprises:
    generating, by the server, the first abnormal message to the monitoring equipment over the network in response to the determination that the analysis data is not received by the server, and displaying, by the monitoring equipment, the data transmission state corresponding to the first abnormal message accordingly; and
    generating, by the monitoring equipment, a fourth abnormal message in response to a determination that the server data is not received by the monitoring equipment, and displaying, by the monitoring equipment, the data transmission state corresponding to the fourth abnormal message accordingly.

7. The monitoring method for data transmission as claimed in claim 6, further comprising:
    generating an alarm message according to the first abnormal message, the second abnormal message, the third abnormal message, or the fourth abnormal message.

8. The monitoring method for data transmission as claimed in claim 7, wherein the data transmission state corresponding to the first abnormal message, the second abnormal message, the third abnormal message, or the fourth abnormal message is displayed in the form of at least one of an icon, a number, a shape, or a symbol, or the data transmission state corresponding to the first abnormal message, the second abnormal message, the third abnormal message, or the fourth abnormal message is displayed by means of a color or dynamic change to at least one of the icon, the number, the shape, or the symbol.

9. The monitoring method for data transmission as claimed in claim 1, wherein the data collection equipment comprises a wired network equipment or a wireless network equipment.

10. The monitoring method for data transmission as claimed in claim 9, wherein the data collection equipment comprises the wired network equipment, and the analysis equipment is disposed on the equipment terminal.

11. A monitoring system for data transmission, comprising:
- a data collection equipment, configured to receive equipment data provided by an equipment terminal and correspondingly to provide collection data;
- an analysis equipment; and
- a monitoring terminal;
- wherein the monitoring terminal configured to periodically determine whether analysis data has been received by the monitoring terminal, provide analysis data when analysis data is received by the monitoring terminal, and generate a first abnormal message in response to a determination that the analysis data is not received by the monitoring terminal, and wherein the monitoring terminal further configured to display the data transmission state corresponding to the first abnormal message accordingly;
- wherein the analysis equipment is configured to periodically determine whether collection data has been received by the analysis equipment, display a data transmission state when collection data has been received by the analysis equipment, and provide a second abnormal message to the monitoring terminal over a network in response to a determination that the collection data is not received by the analysis equipment, and wherein the monitoring terminal is further configured to display the data transmission state corresponding to the second abnormal message accordingly.

12. The monitoring system for data transmission as claimed in claim 11, wherein the data collection equipment provides a third abnormal message to the monitoring terminal through the analysis equipment over the network in response to a determination that the equipment data is not received by the data collection equipment, and the monitoring terminal displays the data transmission state corresponding to the third abnormal message accordingly.

13. The monitoring system for data transmission as claimed in claim 12, wherein the monitoring terminal generates an alarm message according to the first abnormal message, the second abnormal message, or the third abnormal message.

14. The monitoring system for data transmission as claimed in claim 12, wherein the data transmission state corresponding to the first abnormal message, the second abnormal message, or the third abnormal message is displayed in the form of at least one of an icon, a number, a shape, or a symbol, or the data transmission state corresponding to the first abnormal message, the second abnormal message, or the third abnormal message is displayed by means of a color or dynamic change to at least one of the icon, the number, the shape, or the symbol.

15. The monitoring system for data transmission as claimed in claim 12, wherein the monitoring terminal comprises:
- a server, configured to receive the analysis data provided by the analysis equipment to provide server data correspondingly; and
- a monitoring equipment, configured to receive the server data to display the data transmission state correspondingly.

16. The monitoring system for data transmission as claimed in claim 15, wherein the server generates the first abnormal message to the monitoring equipment over the network in response to a determination that the analysis data is not received by the server, and the monitoring equipment displays the data transmission state corresponding to the first abnormal message accordingly, and the monitoring equipment generates a fourth abnormal message in response to a determination that the server data is not received by the monitoring equipment, and the monitoring equipment displays the data transmission state corresponding to the fourth abnormal message accordingly.

17. The monitoring system for data transmission as claimed in claim 16, wherein the monitoring equipment generates an alarm message according to the first abnormal message, the second abnormal message, the third abnormal message, or the fourth abnormal message.

18. The monitoring system for data transmission as claimed in claim 17, wherein the data transmission state corresponding to the first abnormal message, the second abnormal message, the third abnormal message, or the fourth abnormal message is displayed in the form of at least one of an icon, a number, a shape, or a symbol, or the data transmission state corresponding to the first abnormal message, the second abnormal message, the third abnormal message, or the fourth abnormal message is displayed by means of a color or dynamic change to at least one of the icon, the number, the shape, or the symbol.

19. The monitoring system for data transmission as claimed in claim 11, wherein the data collection equipment comprises a wired network equipment or a wireless network equipment.

20. The monitoring system for data transmission as claimed in claim 19, wherein the data collection equipment comprises the wired network equipment, and the analysis equipment is disposed on the equipment terminal.

* * * * *